INVENTOR.
LEONARD O. CURRY
BY
Fishburn and Gold
ATTORNEYS

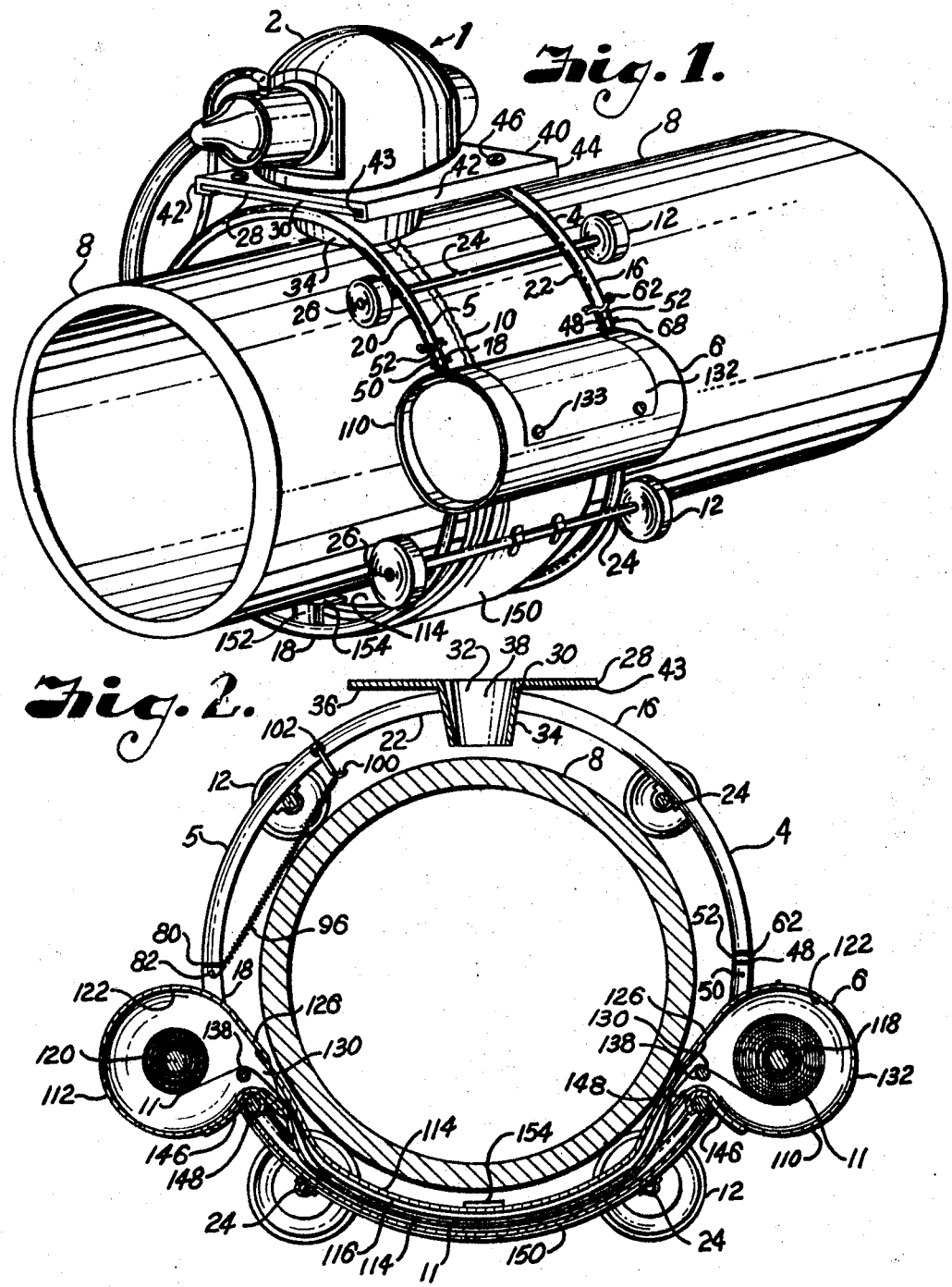

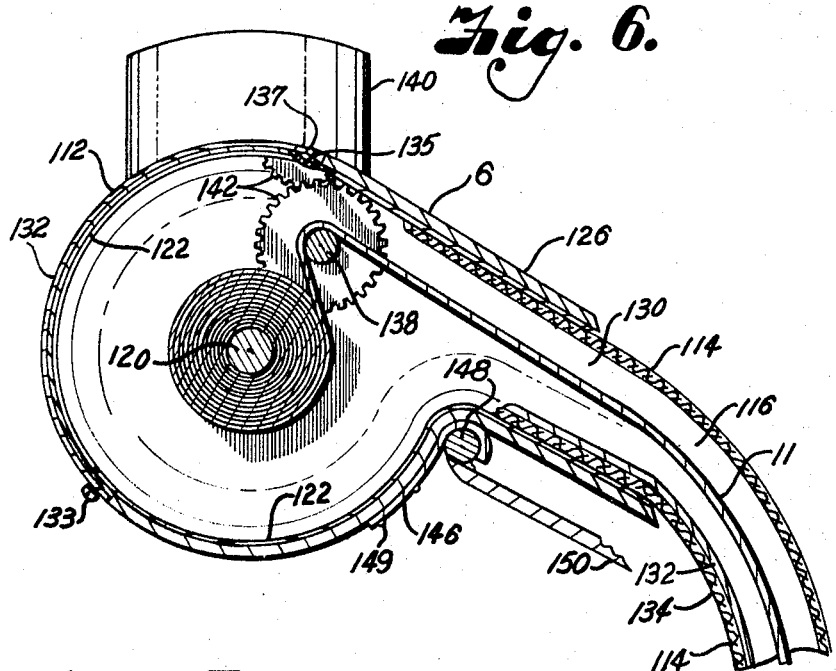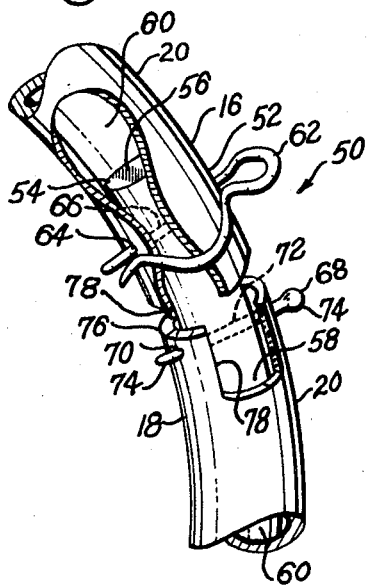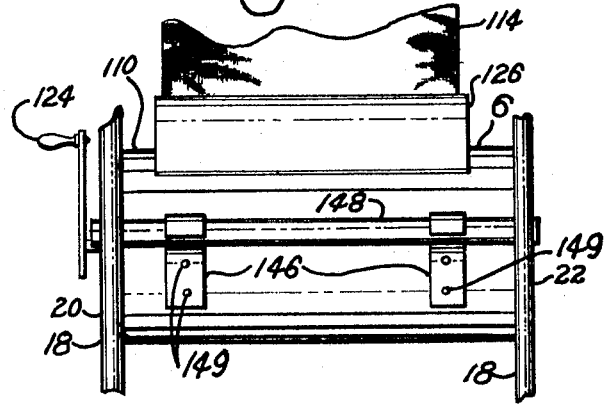

United States Patent Office 3,445,655
Patented May 20, 1969

3,445,655
APPARATUS FOR THE SUPPORT AND MOVEMENT OF RADIOGRAPHIC EQUIPMENT ON AN ELONGATED PIPE
Leonard O. Curry, Nevada, Mo. 64772
Filed Aug. 18, 1966, Ser. No. 573,353
Int. Cl. G01n 23/04; H01j 37/22
U.S. Cl. 250—65
5 Claims

ABSTRACT OF THE DISCLOSURE

Apparatus for the support and movement of radiographic equipment during the radiographic examination of an object such as an elongated pipe comprises a carrier having spreadable rigid portions adapted for exteriorly encompassing the object, rollers on the carrier with peripheral portions positioned radially inwardly thereof for engaging the exterior surface of the object, passageway structure for disposing a length of film along a length of the carrier and a bracket on the carrier opposed and spaced from the passageway structure for directing penetrating radiant energy through the object and onto the film.

---

This invention relates to the radiographic examination of welds and flaws in pipes, tanks, vessels and the like and more particularly, to an apparatus to support and position a radiographic examination device and its associated film.

Heretofore, the radiographic examination of welds and flaws in pipe lines or various types of containers or vessels, for example, by X-ray devices, has been a very cumbersome and time consuming operation, as it is necessary to accurately position the X-ray device in opposed relation to a length of film, expose the film to the X-rays, then adjust the film and the device separately about the pipe or container to expose a second length of film to examine a second portion of said pipe and so on about the entire surface. The X-ray devices utilized in this operation are bulky and heavy in nature and normally six or more moves or adjustments of the X-ray devices and the film are necessary to examine the circumference of a weld, pipe or the like.

The principal objects of this invention are: to alleviate the aforementioned difficulties in the art by providing a new and novel apparatus to support a radiographic device and its associated film in the desired relative position to one another and to the object to be examined; to provide such an apparatus which may be easily and quickly adjusted or moved about an object to facilitate a radiographic examination thereof; to provide such an apparatus including a carrier which may be handled by a minimum of personnel and easily and quickly assembled about an object such as a pipe or container to be inspected; to provide such an apparatus having a generally circular bracket with a plurality of roller means mounted to said bracket and adapted to rollingly engage the exterior surface of a pipe or container, said bracket being adapted to carry a radiographic device and film in the desired relative position and to facilitate the adjustment or movement of the device and film about the pipe or container; to provide such an apparatus having a pair of film containers releasably retained on said bracket, each of said containers having film reels operatively mounted therein and a means extending between said containers defining a passageway therethrough for the passage of said film from one container to the other, said means being operable to position a length of said film between said containers for exposure by the radiographic device; to provide such an apparatus which may be simply and inexpensively manufactured, easily assembled and disassembled and handled to facilitate the radiographic examination; to provide a new and novel film handling means for use with said bracket or separately for retaining film, dispensing said film for exposure, and rolling up said film after exposure, said means being comprised of a supply container and a take-up container, each having film reeling means therein with a flat tubular member or cassette operatively connected to each of said containers and defining a connecting light-tight passageway between said film containers through which said film may be moved from the supply container to the take-up container.

Other subjects and advantages of this invention will become apparent from the following description taken in connection with the accompanying drawings wherein are set forth by way of illustration and example certain embodiments of this invention.

FIG. 1 is a perspective view of two pipe sections having a weld connecting said sections with an apparatus mounted on said pipe sections for the radiographic examination of said weld, said apparatus embodying the features of this invention.

FIG. 2 is a vertical sectional view through the apparatus and a pipe section.

FIG. 6 is a vertical sectional view through the film take-up container and a portion of the flat tubular member or cassette defining a passageway between the supply and take-up film containers.

FIG. 7 is a perspective view of the apparatus shown in FIG. 3 with a portion of the brace member broken away to show a hinge joint between the film supporting and radiographic device supporting members of said bracket.

FIG. 8 is a fragmentary bottom view of the apparatus shown in FIG. 3 illustrating the releasable connection of the film containers to the bracket.

Figure 3:
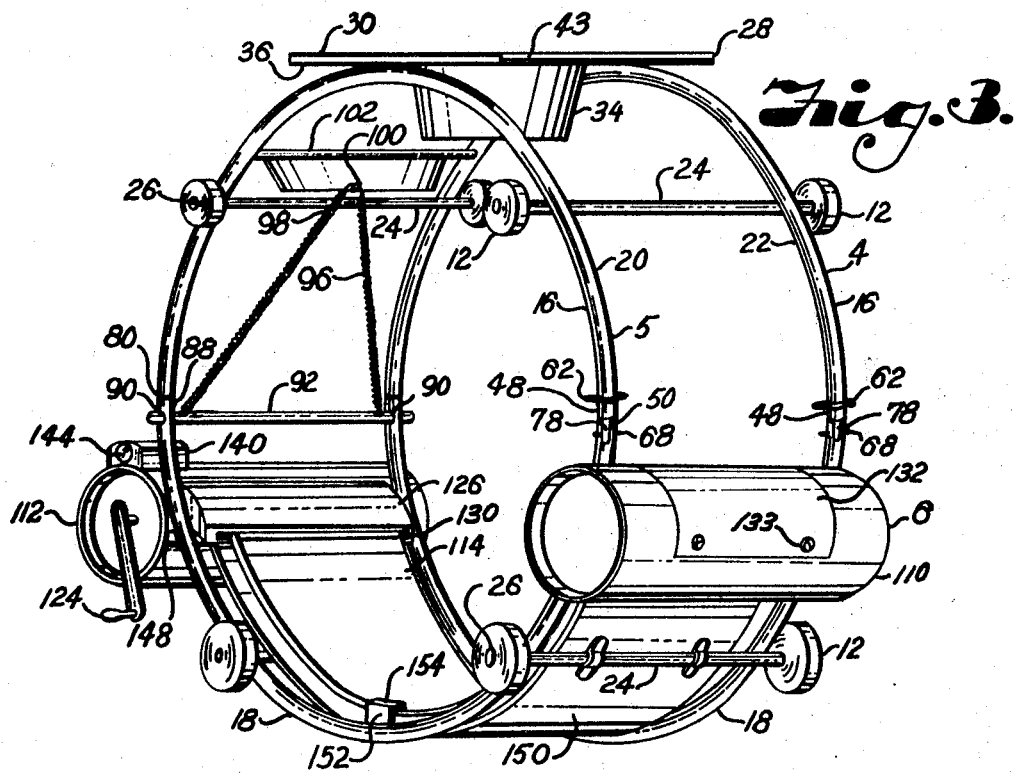
FIG. 3 is a perspective view of the radiographic examination apparatus shown in FIG. 1 with the radiographic device removed.

Referring to the drawings in more detail:

The reference numeral 1 indicates a radiographic examination apparatus embodying the features of this invention and being generally comprised of a radiographic means illustrated as an X-ray device 2, a carrier or vehicle assembly 4 and a film disposition means 6. Referring to FIG. 1, the radiographic examination apparatus 1 is illustrated as being disposed circumferentially about a pair of pipe sections 8, said pipe sections being joined by weld 10. The radiographic examination device 2 is retained in the desired spaced relation from the weld 10 by means of carrier 4, said carrier 4 also retaining or positioning the film disposition means 6 in its desired spaced relation from the pipe sections 8 and weld 10 in opposed circumferential relation to the radiographic device 2, such that the radiant energy transmitted from the device 2 may pass through the weld 10 of pipe sections 8 exposing a length of film to examine a segment of weld 10. The radiant energy is directed through the weld 10 at a slight angle to provide an offset between the two opposed segments of weld 10 through which the energy passes. The examination apparatus 1 may then be shifted about pipe sections 8 to examine other segments of weld 10 by revolving apparatus 1 circumferentially about the pipe sections 8 and placing a new length of film in opposed relation to the radiographic device 2. The apparatus 1 includes means operatively connected thereto to movably engage the object to be examined, said means being illustrated as a plurality of rollers 12 disposed in circumferential rolling engagement with the pipe sections 8 to facilitate the adjustment of the radiographic examination equipment about the pipes 8.

Referring to FIGS. 2 and 3, the carrier 4, as illustrated, is comprised of a bracket member 5 which is cylindrical and generally conforming in shape to the pipe 8 on which the bracket is disposed. The bracket 5, as illustrated, has separable or spreadable portions to encompass the object to be examined including a radiographic device supporting or upper bracket portion 16 and a lower or film supporting portion 18. Each of the portions 16 and 18 are comprised of a pair of bent rigid tubular members 20 and 22 which are formed into a generally semicircular shape and disposed in opposed spaced relation and retained in said relation by means of a plurality of cross braces or axles 24. As illustrated, the axles 24 extend between the spaced tubular members 20 and 22 and outwardly from each of said members 20 and 22 with a roller 12 rotatably mounted on each end 26 of said axles 24.

The upper portion 16 of bracket 5, as illustrated, is an X-ray mounting 28 welded to the tubular members 20 and 22. The mounting 28 has a tangentially disposed plate 30 defining a central aperture 32, said aperture having a circumferential flange 34 mounted on the undersurface 36 of plate 30 defining a through passage 38. The X-ray device 2 may be secured to the mounting 28 by various means. In the illustrated embodiment, the X-ray device 2 has a supporting plate 40 mounted thereto, said plate 40 having a hook flange 42 extending longitudinally of a pair of opposed side edges 44 of said plate 40, said hook flange 42 being disposed over the side edges 43, said side edges 43 being transversely extended into the direction of movement of carrier 4. As the X-ray device 2 is rotated circumferentially about the pipe sections 8, the hook flange 42 will retain the X-ray device 2 in its relative position on the mounting 28. A pair of bolts 46 extend through plate 40 to threadingly engage the mounting plate 28 to prevent displacement of the device 2 in a direction lateral to the direction of rotation of the device 2 about the pipe section 8.

The bracket portions 16 and 18 are joined together at 48 by means of a hinge connection 50, as illustrated in FIG. 7. The end portions 52 of tubular members 20 and 22 of the bracket portion 16 each contain a stud member 54 having end portions 56 and 58 with the end portion 56 releasably retained within the interior space 60 within each of the tubular members 20 and 22 by means of a retaining pin 62 which extends through a pair of apertures 64 in each of the tubular members 20 and 22 and through a bore 66 in stud 54 which lies in aligned relation with the apertures 64. The lower portion 58 of the stud member 54 is disposed within the inner space 60 of each of the tubular members 20 and 22 of the bracket member and is retained therein by a hinge pin 68 which extends through a pair of apertures 70 in each of the tubular members 20 and 22 and a bore 72 in the end portion 58 of the stud member 54 to hingedly retain stud member 54 in relation to the lower bracket portion 18. The hinge pin 68 has a pair of enlarged head portions 74 to retain said pin in the proper position. The end portions 76 of each of the tubular members 20 and 22 of the lower bracket member 18 have a pair of opposed slots 78 cut through their side wall to allow the lower portion 58 of the stud member 54 to pass through the plane of the side wall of the tubular members 20 and 22 as the upper bracket portion 16 is hinged or rotated relative to the lower bracket portion 18.

Figure 4:
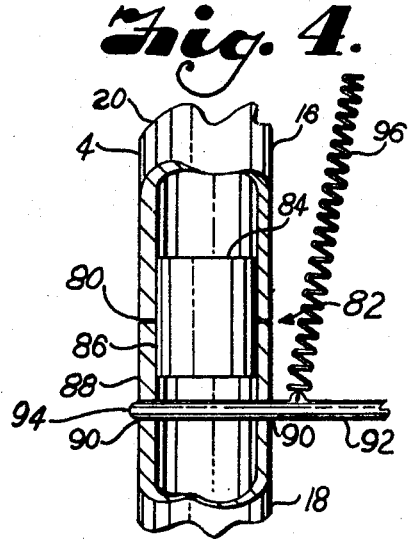
FIG. 4 is a fragmentary perspective view of the apparatus shown in FIG. 3 with a portion of one of the tubular braces of the bracket broken away to show the connection between the film supporting and radiographic device supporting members of said bracket.

The upper and lower bracket portions 16 and 18 are also releasably retained at 80 by means of connection 82. As illustrated in FIG. 4, the tubular members 20 and 22 of bracket portion 16 each have an inner stud member 84 retained therein as by welding having a portion 86 extending outwardly therefrom and received by the tubular members 20 and 22 of the bracket portion 18. An end portion 88 of each of the tubular members 20 and 22 of the bracket portion 18 has a pair of aligned apertures 90 through the side walls thereof with a spring retaining bar 92 having end portions 94 received through each of the pairs of aligned apertures 90. The portions 16 and 18 are resiliently retained together as by a V-shaped spring member 96 which is secured by suitable means to the retaining rod 92 to resiliently retain the stud member 84 in its inserted position within the tubular members 20 and 22 of the lower portion 18. The V-shaped spring member has an apex portion 98 which is received by a hook flange 100 mounted on a rotatable bar 102 which is journaled in the tubular members 20 and 22 of the bracket portion 16.

The film disposition means 6, which is illustrated as being releasably retained by the lower or film retaining bracket portion 18, is generally comprised of a pair of film containers or magazines 110 and 112 with a flat tubular member or cassette 114 connected to each of said containers 110 and 112 and extending between said containers to define a connecting passageway 116 for the movement of film between containers 110 and 112. Each of said containers 110 and 112 have a reeling means releasably retained therein with the container 110 having a film supply reel 118 and film container 112 having a film take-up reel 120. Each of the containers or magazines 110 and 112 contain a lining 122 of lead or other suitable material to protect the film from accidental exposure by stray or rebounding X-rays. Each of the magazines 110 and 112 contain a spout-like protruding member 126 defining a passageway 130 through which the film passes from the supply reel 118 to the take-up reel 120. The magazines 110 and 112 each have a light-tight closure member 132 hingedly mounted thereto to provide access to the interior of the magazines 110 and 112 for film loading and unloading. The closure member 132 is secured in place by set screws 133 with a resilient plastic cover 135 over the hinge connection 137 to prevent the entry of light rays into said magazines 110 and 112.

As illustrated in FIG. 6, the flat tubular member or cassette 114 is adhesively retained within said passageway 130 to the spout-like member 126. The cassette 114 may be formed of a canvas treated to prevent the entry of light or other suitably flexible light-tight material to allow the passage therethrough of radiant energy to expose the length of film disposed between the spaced film containers 110 and 112. The lower wall or portion 134 of cassette 114 contains a lining 136 of lead, or other suitable material to protect the film from back scatter of X-rays or other radiant energy off the ground or other substances which would cause additional exposure of the film.

Each of the film magazines 110 and 112 contain a roller 138 suitably journaled therein adjacent the spout-like member 126 to properly orient the film on its entry or exit from the respective containers 110 and 112 and to provide a tensioning of said film to facilitate the film rolling operation. As illustrated in FIG. 6, the roller 138 is operatively connected to a calculator 140 by means of a gear assembly 142 to indicate on dial 144 the rotation of roller 138 and thereby the length of film being rolled into the magazine or container 112 on take-up reel 120. The calculator 140 may be of any conventional type as found in various cameras and other devices for merely showing the length of film to be rolled to move the exposed film into the container 112 and to provide a new unexposed length of film within the passageway 116 of the cassette 114 for a second exposure.

The film containers 110 and 112 are each releasably retained to the lower bracket portion 18 by means of a pair of hook flanges 146 secured by rivets 149 or other suitable means to each of the containers 110 and 112. The bracket 118 has a pair of properly spaced transverse retaining bars 148 extending between and secured to the tubular bracket members 20 and 22 to receive the hook flange 146 of each of the containers 110 and 112. By releasably retaining containers 110 and 112 on the carrier 4, the containers 110 and 112 and the cassette 114 may be removed as an assembly and used separately for film exposure where the nature of the surface of the container or other article being inspected so dictates.

A guide plate 150 extends between and is welded to the transverse rods 148 to provide a supporting surface for the cassette 114 in the space between the film containers 110 and 112. The guide plate 150 is arcuately shaped to conform to the curvature of the carrier 4 and has a pair of retaining clips 152 welded thereto with a flange portion 154 in overlying relation to the cassette 114 to retain said cassette 114 on the guide plate 150.

Figure 5:
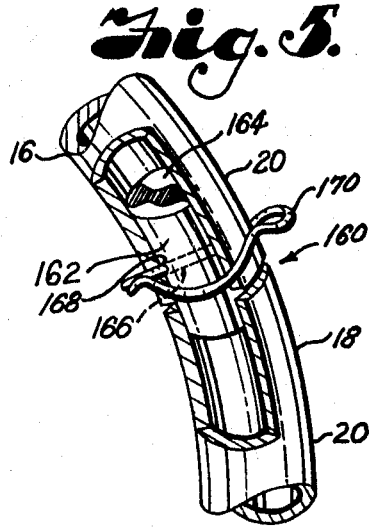
FIG. 5 is a fragmentary perspective view of the apparatus shown in FIG. 3 with a portion of the tubular brace of the bracket broken away to show a second form of connection between the film supporting and radiographic device supporting members of said bracket.

In FIG. 5, a modified connection 160 is shown between the upper and lower bracket portion 16 and 18 respectively employing a stud member 162 welded within the tubelike members 20 and 22 of the lower bracket portion 18 and having an outwardly extending portion 164 received within the tubular members 20 and 22 of the upper bracket portion 16. A bore 116 extends through the forwardly extending portion 164 of the stud member 162 and lies in aligned relation with a pair of apertures 168 through the tubular members 20 and 22 of bracket portion 16. A retaining pin 170 is received through said bore 166 and apertures 168 to fasten the upper bracket portion 16 to the lower bracket portion 18. This modified connection 160 may be utilized at either 48 or 80 to connect the bracket portions 16 and 18 together.

The radiographic examination of the weld 10 is commenced by the positioning of the carrier 4 about the pipe sections 8. This is accomplished by disconnecting the spring 96 from the hook 100 and swinging the bracket portions 16 and 18 to an open position about the hinge connection 50. The carrier 4 now in its open position is slipped over the pipe sections 8 and moved to a closed position wherein the stud members 84 of bracket portion 16 are received in the tubular members 20 and 22 of the lower bracket portion 18 and the spring member 96 is placed over the retaining hook 100.

Prior to the installation of the carrier 4 about the pipe sections 8, the X-ray film is loaded into the film disposition means 6 in a dark room by placing a roll of film on a reel 118 in the film supply container 110. The film is then threaded over roller 138 and through the cassette 114 to the take-up reel 120. By opening the closure member 132 from the upper portion of the film container 112, the film may be threaded over roller 138 and connected to the take-up reel 120. The containers 110 and 112 are then placed in position on the carrier 4 by disposing the hook flanges 146 over the retaining bar 148. The X-ray device 2 is secured to the mounting 28 and activated to expose the length of film presently contained in the cassette 114. After exposure of this length of film, the exposed film is rolled onto the take-up reel 120 by rotation of the crank 124. The calculator 144 will indicate when the desired length of film has been rolled onto the reel 120 and a new exposure operation can be commenced. The apparatus 1 is then rotated circumferentially about the pipe sections 8 to a new location and a second exposure is made. This operation is continued until the desired number of exposures have been made to inspect the weld 10.

After completion of the exposure operation, the apparatus 1 may be removed from the pipe sections 8 by removing the X-ray device 2 from the mounting 28, releasing the spring 96, separating the bracket portions 16 and 18 at connection 82 and hinging said portions 16 and 18 to an open position so that the carrier 4 and film disposing means 6 can be easily slipped off the pipe sections 8. The carrier 4 may also be removed from the pipe sections 8 with the device 2 and the film disposing means 6 in position on the carrier 4.

It is to be understood that while I have illustrated and described one form of my invention, it is not to be limited to the specific form or arrangement of parts herein described and shown except insofar as such limitations are included in the claims.

What I claim and desire to secure by Letters Patent is:

1. An apparatus for the support and movement of radiographic equipment during the radiographic examination of an object comprising:
   (a) a carrier means having spreadable rigid portions adapted for exteriorly encompassing the object under examination,
   (b) cooperative means on each of said portions of the carrier means to releasably retain said portions in an encompassing relation to said object,
   (c) said carrier means having roller means operatively connected thereto with peripheral portions positioned radially inwardly thereof and adapted for engaging the exterior surface of said object for movably supporting said carrier means on said object while encompassing said object, and
   (d) means on said carrier means for disposing a length of film in the desired relation to said object for exposure by penetrating radiant energy.

2. An apparatus as recited in claim 1 wherein:
   (a) said object is cylindrical and said roller means are at least three in number and circumferentially spaced apart to entirely support said carrier means on the exterior surface of said object.

3. An apparatus as recited in claim 1 wherein the spreadable portions of the carrier means are generally semicircular.

4. An apparatus as recited in claim 1 wherein:
   (a) said carrier has a mounting means operatively connected thereto in opposed and spaced relation to said film disposing means to releasably retain a penetrating radiant energy emitting means.

5. An apparatus for the support and movement of radiographic equipment during the radiographic examination of an object comprising:
   (a) a carrier means having spreadable portions to encompass the object under examination, said carrier means having means operatively connected thereto to movably engage said object,
   (b) cooperative means on each of said portions of the carrier means to releasably retain said portions in an encompassing relation to said object,
   (c) means on said carrier means for disposing a length of film in the desired relation to said object for exposure by penetrating radiant energy or the like,
   (d) means operatively connected to said carrier means in opposed spaced relation from said film disposing means to emit penetrating radiant energy,
   (e) said spreadable portions having opposed end portions hingedly connected for swinging movement, the opposite end portion of each of said arcuate portions having cooperative means thereon for releasably retaining said end portions together,
   (f) said means to movably engage said object including a plurality of rollers mounted on said carrier and adapted to rollingly engage said object in a circumferential manner for movement in a circumferential direction about said object and thereby facilitate the movement of said carrier about said object,
   (g) said film disposing means including a film supply container and a film take-up container, each of said containers being releasably connected to said carrier in spaced relation from one another and each of said containers having a reel operatively mounted therein to retain said film, said take-up container having a handle means operatively connected to the reel of said container for rotating said reel to move the film from the supply container to the take-up container, said take-up container also containing a film length calculator opereratively connected thereto to indicate the length of film being rolled into the take-up container and a film passage defined by a cassette having opposed end portions, the end portions of said cassette being operatively connected to each of said containers to define a light-tight passageway between said containers, said cassette having an exterior wall outwardly from the object being examined having a lead lining to prevent the back scatter of radiant energy, (h) said radiant energy emitting means being an X-ray device.

References Cited

UNITED STATES PATENTS

| | | | |
|---|---|---|---|
| 2,349,427 | 5/1944 | Heimerich | 250—66 |
| 2,847,580 | 8/1958 | Arvanetakis et al. | 250—68 |
| 2,905,824 | 9/1959 | Thielsch | 250—68 |
| 3,124,689 | 3/1964 | Shure | 250—106 |

RALPH G. NILSON, *Primary Examiner.*

A. L. BIRCH, *Assistant Examiner.*

U.S. Cl. X.R.

250—66, 68